UNITED STATES PATENT OFFICE.

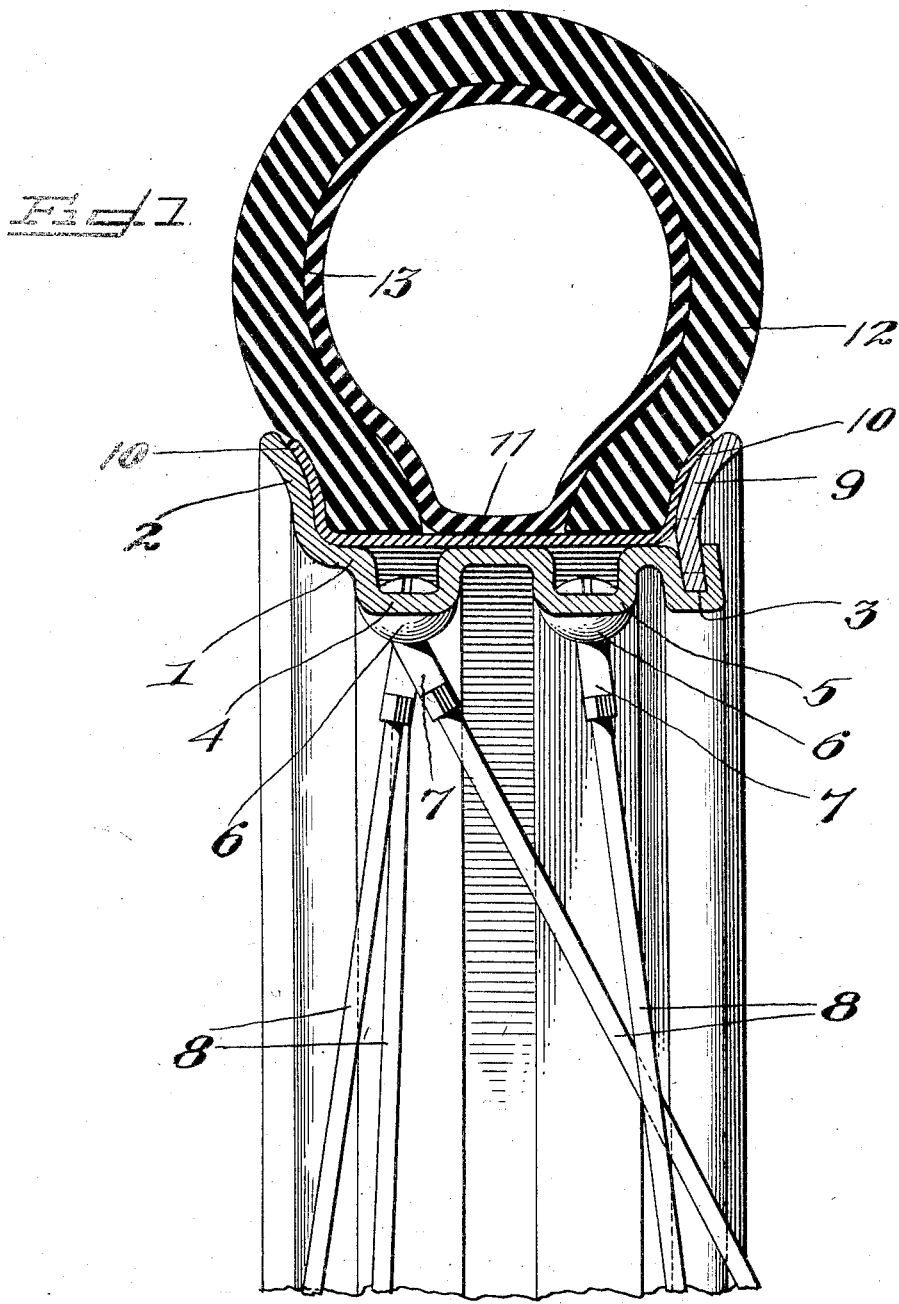

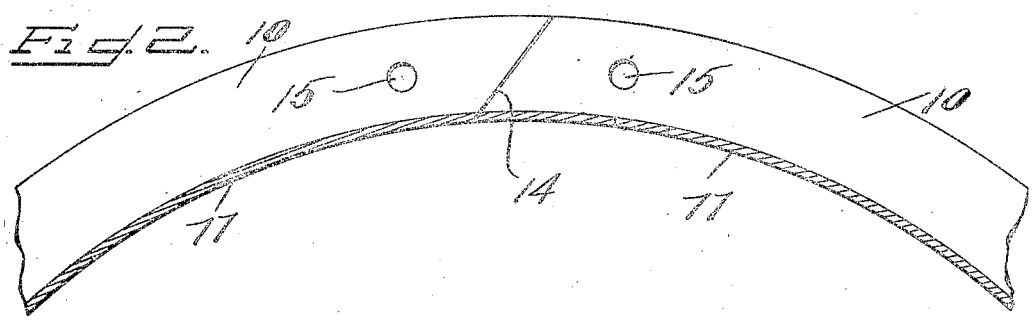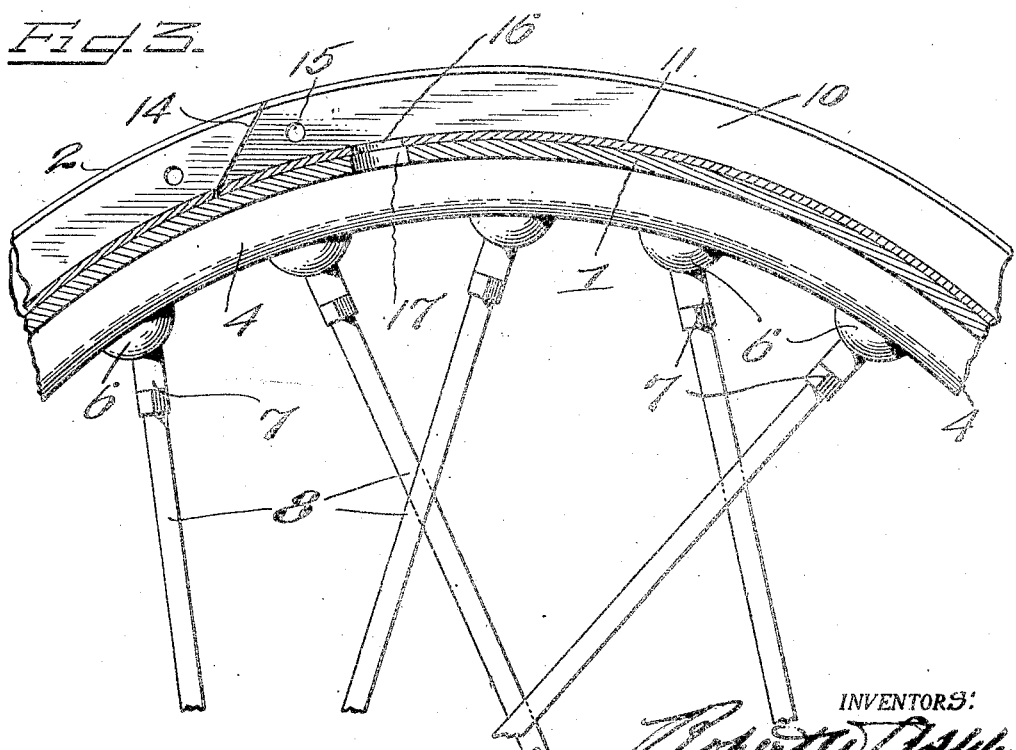

ROBERT W. ASHLEY, OF NEW YORK, N. Y., AND FRANK OBERKIRCH, OF ST. MARYS, PENNSYLVANIA.

DEMOUNTABLE RIM FOR WIRE WHEELS AND THE LIKE.

1,305,683.  Specification of Letters Patent.  Patented June 3, 1919.

Application filed March 20, 1917. Serial No. 156,040.

*To all whom it may concern:*

Be it known that we, ROBERT W. ASHLEY and FRANK OBERKIRCH, citizens of the United States, and residents, respectively, of New York city, in the county of New York and State of New York, and St. Marys, Elk county, Pennsylvania, have invented new and useful Improvements in Demountable Rims for Wire Wheels and the like, of which the following is a specification.

The invention relates to improvements in demountable rims for wire wheels and other vehicle wheels utilizing pneumatic and solid tires for motor cars.

One object of the invention is the providing of a fixed wheel rim having formed therein means adapted to receive an auxiliary rim, and means adapted to receive a series or plurality of spokes strung under tension between said fixed rim and a suitable hub.

Another object of the invention is the providing of supporting channels formed in the body of the fixed rim adapted to have punched therein suitable cups arranged to receive the spoke nipples of wire spokes, the supporting channels thereof providing a means arranged to prevent the distortion of the felly band or rim and of the injury of the tension of all of the spokes strung between said rim and a suitable hub.

Another and further object of the invention is the providing of detachable means forming part of the fixed rim, arranged to receive an auxiliary semi-flexible or rigid demountable rim to which a pneumatic tire or other form of tire is attached and when not in use carried as a spare rim. By constructing the demountable rim which may be of a semi-flexible nature, out of a comparatively thin cold rolled steel, a suitable auxiliary demountable rim is provided which when placed upon the wheel rim and the tire inflated becomes substantially part of the wheel rim structure as a whole, the detachable means as associated with the fixed rim providing a means of readily and quickly demounting the auxiliary rim from the rim structure, and further by reason of its semi-flexibility the increased inflation of a pneumatic tire together with the natural action of a rotating wheel body, the auxiliary or demountable rim is forced into the proper relation with the fixed rim, said auxiliary rim further providing an even base provided with uninterrupted surfaces for the tire beads and the inner tube, thereby providing means that will at all times prevent the rupture of the tire and tube.

Heretofore rims for wire wheels have been made of substantially heavy gage metal and it has been found that by punching the reception cups therein for the spoke nipples that when a wheel has been placed under tension or trued up in symmetric form that such action distorts the top rim and throws it substantially out of round at diverse places in the surface of the rim owing to the fact that the spoke ends were mounted in the reception surface of the rim, and by forming in the base of the rim the channels as above described, a wheel rim is provided with greater strength in its cross section, and one obviating the fault of drawing a wheel rim body out of true and of the effect or action on the tension of the spokes strung between said fixed rim and a suitable hub. The type of rim as described herein provides a suitable demountable rim and one which when carried as a spare rim with a tire thereon greatly decreases the weight and further protects the tire and tube, for this type of demountable rim may not only be utilized on a wire wheel employing a demountable rim structure, but may also be used upon a wheel body detachable or demountable from the axle end of a vehicle.

It has also been found in the manufacture of wire wheels for motor vehicle purposes, that the continued action of the pneumatic tire structure thereon affects the condition of the wheel to such an extent that it is necessary to at all times true up the spoke lacing in the wheel in order to have it retain its symmetry, and further, the continued action of the spokes in the fixed rim have more or less a deterring action upon the beads of the pneumatic tire which eventually affects and causes the destruction of the tube and the vital rupture of the sustaining body of the pneumatic tire. Furthermore, the present form of a detachable means for removing a tire from the present type of wire wheel has been more or less inadequate and by using the auxiliary or independent tire rim as herein described a factor of safety is added owing to the fact that by the increased inflation of the tire on the fixed rim (which is not only a fixed rim but also a tire and rim reception rim) the independent rim structures are held normally locked together.

In the following is described in connection with the accompanying drawings, one embodiment of the invention, the features thereof being more particularly pointed out hereinafter in the claims.

In the drawings:

Figure 1 is a detail vertical sectional view of a wheel felly or rim and an auxiliary rim having mounted thereon the standard type of straight side pneumatic tire and tube;

Fig. 2 is a detail annular sectional view of the auxiliary rim at a point adjacent the split therein;

Fig. 3 is a detail annular sectional view of the assembled rim structure at a point adjacent the tube valve stem aperture in both the auxiliary rim and the felly band or rim;

Fig. 4 is a modified form of a wire wheel rim.

Similar numerals of reference indicate similar parts throughout the several views.

In the drawings 1 designates the body of a fixed rim having formed at its back edge a tire and rim reception bead 2 and at its front edge a depending channel 3 and in its central body portion thereof the depending channels 4 and 5 which have punched therein suitable cups 6 adapted to receive the nipple 7 of a series or plurality of spokes 8 strung between said rim body 1 and a suitable hub under a predetermined tension.

Channel 3 has mounted therein a detachable side flange 9 forming the opposite tire or rim flange and is arranged together with flange 2 to engage the side flanges 10 of auxiliary semi-flexible or flexible demountable rim 11 having mounted thereon a pneumatic tire casing or shoe 12 which has in turn mounted therein a sutiable tube of the standard type 13.

Said rim 11 is split transversely thereof on a diagonal plane at one place in its circumference at 14 and said flanges 10 have cut therein apertures 15 to receive a suitable rim breaking tool for demounting said rim 11 from a pneumatic tire.

A suitable valve stem aperture 16 is formed in rim 11 and is arranged to be brought into alinement with a suitable valve stem aperture 17 in the body of wheel band or rim 1.

It is obvious that the structure as herein shown and described may be varied in many of its essential features without departing from the spirit of the invention.

What we claim and desire to secure by Letters Patent of the United States is:

1. A device of the character described comprising a fixed rim provided with tire and spoke reception means and a channel adapted to receive a detachable retaining ring, and a removable tire supporting rim adapted to engage said fixed rim and said detachable retaining ring, said removable rim being sufficiently rigid to support a semi-inflated tire under normal conditions and smaller in contour than the reception surface on said fixed rim, and of sufficient flexibility to permit of its spreading and locking itself in said fixed rim when a tire is under full inflation thereon.

2. A device of the character described comprising a fixed rim having formed therewith tire reception means, and a detachable side ring reception means, a detachable ring mounted therein, and a demountable tire supporting rim arranged to engage said fixed rim and said detachable ring of sufficient rigidity to support a semi-inflated tire thereon, and being sufficiently smaller in contour as to seat itself on said fixed rim between the retaining means thereon when in normal condition, yet being sufficiently flexible as to spread transversely thereof and seat and lock itself on said fixed rim when said tire is inflated.

In witness whereof we have hereunto signed our names in the presence of two subscribing witnesses.

ROBERT W. ASHLEY.
FRANK OBERKIRCH.

In the presence of—
E. E. HAINES,
M. J. PFEIFFER.